United States Patent [19]

Augusteijn

[11] Patent Number: 5,666,517
[45] Date of Patent: Sep. 9, 1997

[54] MULTI-MEDIA SYSTEM FOR INTERACTIVE PRESENTATION HAVING APPARATUS WHICH CONVERTS MACHINE-TYPE GENERIC MULTI-INSTRUCTION TO MACHINE-TYPE SPECIFIC OBJECT CODE

[75] Inventor: Alexander Augusteijn, Eindhoven, Netherlands

[73] Assignee: U.S. Philips Corporation, New York, N.Y.

[21] Appl. No.: 278,365

[22] Filed: Jul. 21, 1994

[30] Foreign Application Priority Data

Jul. 22, 1993 [EP] European Pat. Off. ............ 93202151

[51] Int. Cl.$^6$ .................................................. G06F 9/455
[52] U.S. Cl. ............................................................ 395/500
[58] Field of Search .................................. 395/500, 700, 395/375, 775; 364/578, 147

[56] References Cited

U.S. PATENT DOCUMENTS

| | | | |
|---|---|---|---|
| 4,667,290 | 5/1987 | Goss et al. | 395/700 |
| 4,710,872 | 12/1987 | Scarborough | 395/700 |
| 5,093,916 | 3/1992 | Karp et al. | 395/700 |
| 5,313,614 | 5/1994 | Goettelmann et al. | 395/500 |
| 5,339,431 | 8/1994 | Rupp et al. | 395/700 |
| 5,442,790 | 8/1995 | Nosenchuck | 395/700 |

FOREIGN PATENT DOCUMENTS 0510616  10/1992  European Pat. Off. .......... G06F 9/45

OTHER PUBLICATIONS

"Technology Support of Multimedia" IEE Colloquium, Apr. 13, 1992, p. 1.

"Taos: AnInnovation in Operating Systems" by Dick Pountain, Mar. 1991, BYTE pp. 901S–117 to 901S–126.

Making A Compiler Easily Portable, IEEE 1988.

*Primary Examiner*—Kevin J. Teska
*Assistant Examiner*—Dan Fiul
*Attorney, Agent, or Firm*—Debra K. Stephens

[57] ABSTRACT

A multi-media system for interactive presentation of user information has a physical interface for receiving removable and unitary mass storage elements for therein storing an interactive user program, and selectively accessing the mass storage element. The system accesses and processes the user program, for subsequent display of processing results, in response to particular user actuation on a level of elementary user functionality. In particular, the processing includes blockwise conversion to object code of machine-type generic multi-instruction blocks read from the storage to machine-type specific object-code blocks for subsequent selective accessing of the object code for processing.

9 Claims, 5 Drawing Sheets

```
int f (x,y)
int x[], y[];
{ int i, s, t;
  s = 0;
  t = 0;
  for (i = 0; x[i] != 0 ; i++) { s += x[i]; }
  for (i = 0; y[i] != 0 ; i++) { t += y[i]; }
  if (s > t)
  { for (i = 0; y[i] != 0 ; i++) { x[i] = y[i]; } }
  else
  { for (i = 0; x[i] != 0 ; i++) { y[i] = x[i]; } }
}
```

FIG. 4

```
        .seg  "text"              ! [internal]
        .proc    16
        .align   4
        .global   _f
_f:
        mov %o0,%o5
        ld   [%o5],%o4
        mov 0,%o2
        tst  %o4
        be   L77021
        mov 0,%o3
        inc  4,%o5
LY8:                              ! [internal]
        add  %o3,%o4,%o3
        ld   [%o5],%o4
        tst  %o4
        bne,a    LY8
        inc  4,%o5
L77021:
        mov %o1,%o5
        ld   [%o5],%o4
        tst  %o4
        be,a LY7
        cmp %o3,%o2
        inc  4,%o5
LY6:                              ! [internal]
        add  %o2,%o4,%o2
        ld   [%o5],%o4
        tst  %o4
        bne,a    LY6
        inc  4,%o5
        cmp %o3,%o2
```

FIG. 5a

```
LY7:                                    ! [internal]
    ble,a    LY5
    mov  %o0,%o4
    mov  %o1,%o4
    mov  %o0,%o5
L77026:
    ld   [%o4],%o3
    tst  %o3
    be   LE12
    inc  4,%o4
    st   %o3,[%o5]
    b    L77026
    inc  4,%o5
LY5:                                    ! [internal]
    ld   [%o4],%o3
    mov  %o1,%o5
    tst  %o3
    be   LE12
    inc  4,%o4
LY4:                                    ! [internal]
    st   %o3,[%o5]
    ld   [%o4],%o3
    inc  4,%o5
    tst  %o3
    bne,a    LY4
    inc  4,%o4
LE12:
    retl
    nop                                 ! [internal]
    .seg "data"                         ! [internal]
```

MULTI-MEDIA SYSTEM FOR INTERACTIVE PRESENTATION HAVING APPARATUS WHICH CONVERTS MACHINE-TYPE GENERIC MULTI-INSTRUCTION TO MACHINE-TYPE SPECIFIC OBJECT CODE

BACKGROUND OF THE INVENTION

The invention relates to a multi-media system for interactive presentation of user information, having an interface unit for reversibly interfacing to mass storage containing an interactive user program, accessing unit for selectively accessing the mass storage, a processor connected to the accessing unit for processing the user program, a display unit fed by said processor for displaying processing results, and a user actuation unit for, through selective user-actuation, controlling the accessing unit and the processor on a level of elementary user functionality.

1. Field of the Invention

Multi-media refers to at least a combination of text, stationary graphics display and moving pictures, the latter either in animation or in more or less full motion video. Additional or alternative features may reside in further visual display types, as well as in speech or other audio representation, motion, or other sensory communication categories.

2. Description of Prior Art

Generally, in a multi-media system, mass storage is advantageously unitary in that it looks and/or feels like a finite and localized object, such as a disc, box, card or the like. In that case, the physical accessing unit includes some kind of berth unit for removable positioning of the storage in or adjacent to the machine or system. The berth unit will be dimensioned according to the mechanical format and physical interactivity of the accessing means. Various such berth unit formats have been in common usage. On the other hand, the storage may be represented by a shared data base, and in particular, inclusive of a program base that is distant from a local user person. The machine typically is stand-alone, although connection to a local area network is not ruled out. A typical example of such a system is the well-known Compact-Disc Interactive (CD-I) system that is being widely marketed at present, although the present invention is not particularly limited to the use with or in such CD-I system.

In a system of the general category listed supra, the user may answer questions posed by the machine, select menu items, access particular displayed free-style elements, thereby activating a particular machine response, make drawings or compose other information combinations for display and/or storage, or just view/listen to a continuous recorded program while still allowing standard recorder functions such as play, stop, fast forward/reverse, jump and possibly others. Inasmuch as the CD-I system is being contemplated for a wide range of applications, for various categories of user, and for various levels of interactivity and operational speed with respect to its response to a user request or action, the inventor has felt a need to make the storage in an external storage compact on an organizational level, while also retaining compatibility between storage units and players that may both originate from various different manufacturers. Typical such machines may be standard CD-Interactive players, XT/AT personal computers and derivatives, and specific machines like Macintoshes™ and various others being marketed at present or in the future.

SUMMARY OF THE INVENTION

For loading information from the external storage into the machine, data contained in the etched external storage are always interpreted. Data are information elements that are used as objects for operations. On the other hand, a program loaded from such external storage may be either interpreted or compiled. A program is built up from information elements that are used to determine the operations themselves. Ultimately, the storage in the machine or system is based on object code, because execution is immediate and no further actions need then be performed. In general consequence, amongst other things, it is an object of the present invention to provide a system having a compact continuous external storage, thus ruling out storing object code, which requires much space, and in consequence, would need a long time to be read out. If the program length were great, moreover, due to the often limited storage capacity inside the player, the external information must be frequently accessed. Such frequent referencing requires the external storage to be organized in a transparent manner, allowing for easy finding of the correct address. However, object code generally does not allow such easy finding. In particular, where the external storage medium is slow such as due to mechanical delays encountered with discs, tapes, and the like, this would mean a further unacceptable reduction of overall speed.

On the other hand, the object of retaining operational speed rules out continuous storing of instructions/data in source code in the external storage, because these source code instructions must be interpreted on a piecemeal basis, which takes much processing time. Therefore, according to one of its objects, the invention has a processor which includes converter-to-object-code unit for blockwise converting machine-type generic multi-instruction blocks read from the storage to machine-type specific object-code blocks for subsequent local storing and selective accessing of the object code by a secondary accessing unit contained in the processor.

Machine-type generic refers to many of the above generic instructions common to various of the above machine types. Machine-type specific refers to only a single type of machine or only quite closely related types would be able to directly execute such program, such as machines forming part of a particular series that are marketed as commercially "succeeding" each other.

Effectively, machine-type generic instructions have a format that is structured straightforwardly and can be stored in such a way as to allow extremely easy accessing thereof. On any applicable level the access is block-wise, such as by, but not limited to, segmenting. This means that the program itself knows the storage location of each program item exactly, through its own logic structure. The information may even be discriminatable according to the category of such program item.

The invention also relates to a unitary mass storage means for use with the above recited system. Physically, it may be in the shape of a Compact Disk, Magtape, Consumer-type storage cassette, electronic module, or other. Further advantageous aspects of the invention are recited in dependent claims.

BRIEF DESCRIPTION OF THE DRAWINGS

These and other advantageous aspects of the invention will become apparent through the disclosure hereinafter of preferred and exemplary embodiments that are also illustrated with reference to the appended drawing and tables, which show in particular:

FIG. 4 is an example of a particular program listing in the language C;

FIGS. 5A and 5B are the same program. Listing in assembly language;

FIG. 6 is the same program listing in machine-generic language according to the invention.

DESCRIPTION OF THE PREFERRED EMBODIMENTS

Figure 1:
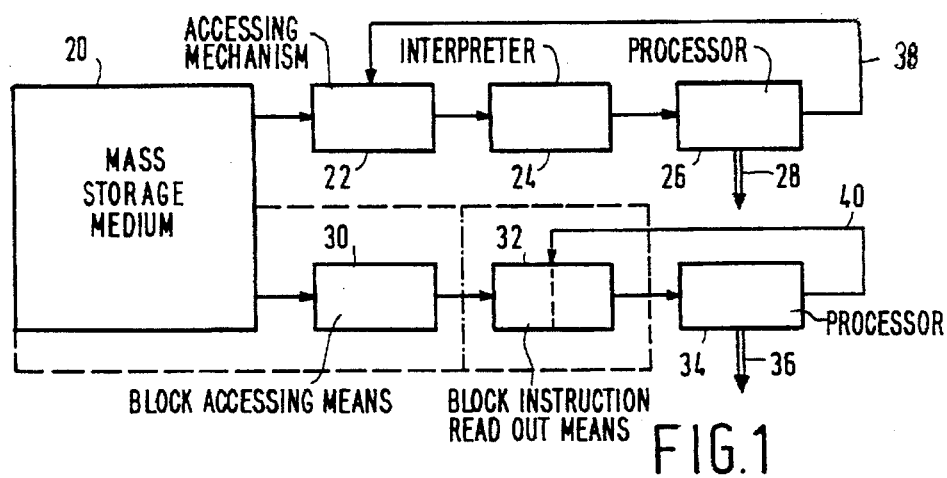
FIG. 1 a schematic of various realizations for a multi-media system for interactive presentation of user information.

FIG. 1 is a somewhat symbolic representation of a schematic of various realizations of a multi-media system for interactive presentation of user information. Block 20 represents the mass storage medium, for example in the form of a CD-I disc, a magnetic tape/tape cassette, a solid-state memory, or other medium, or in the form of a remote program/data base. If the mass storage medium is unitary storage, this block is usually removable, such as in the way of a CD record, through reversible insertion of a storage module, or other into an appropriate slid or other berth. An upper channel represents a first way of accessing the storage. For brevity, electromechanical/optical subsystems have not been described in detail. In a first realization, a stored program contains expressions in high level language, that is usually directly readable by humans, through the use of mnemonics and other types of notations. As a secondary advantage, it is often quite compact. Block 22 represents an accessing mechanism, that accesses and reads from the mass storage medium 20 on an instruction-by-instruction basis. Next, the instruction so read out is interpreted in block 24, to discern what operation should be executed, and also, with respect to what object. The interpreting is done on the basis of hardware-independent operation-codes or opcodes. The interpreter reads opcodes and operands that may or may not match with each other, and modifies data within the machine. In fact, the interpreter behaves like a software processor. In general, such high-level program has various different kinds of instruction formats that may include opcode, operands, source/destination addresses, flags, and various other elements.

On the other hand, the storage means may store object code which generally includes a series of numbers that each represent an elementary machine action or data unit. Object code generally is not readable to humans. The format of the object codes depends on the actual instruction set, but also on the available registers, channels, ports, and other hardware elements. If applicable, interpretation of a source code instruction, or execution of an object code instruction takes place in the processor or processor part 26. The result of such processing may be some user display change, symbolized by arrow 28, and furthermore, may give reason to access a further instruction, as symbolized by arrow 38 that again activates the accessing mechanism 22. The system operates slowly, either because interpreting in block 24 takes much time, or alternatively, because accessing of the object code in the storage medium may be slow as well.

Now, the lower channel represents a second and alternative way of accessing the mass storage medium 20, in particular, according to the invention. Here, the mass storage medium 20 may have exactly the same physical configuration, but the organizational realization is different. FIG. 1 thus depicts two two different realizations. The storage contains blockwise organized instructions in a machine-type generic format, that is, the instructions do not specify actual operations on a register level, although their contents are elementary. This means that the format is independent of the actual register configuration, so that the instruction could be executed on various different hardware machine types. In particular, the hardware, instruction set, and various other provisions and functional properties can show much variation, such as I/O devices, drivers, video hardware, timers, mouse, etcetera, although a certain generic character is common to a part or all of these elements. Blockwise accessibility is realized by associated addresses, labels, sectoring or the like. The accessing on the level of a block is executed by hardware machine block or accessing unit 30. In hardware block 32, the block of instructions read out is translated or converted to object code that is machine specific for the machine in question. Other types of machines could, in consequence, probably not execute the result of this particular translation. The translation also results in expanding. Next, the instructions now available are selectively executed by processing element 34 that to a large degree corresponds to processor 26 described supra. The user display change is again represented by arrow 36; however, in contradistinction to the situation with respect to block 26, retrocoupling is now foremost to the same block of translated instructions as symbolized by arrow 40. The relatively rare occurrence of an out-of-block reference that would activate the accessing unit 30, has been omitted for brevity. A vertical broken line in block 32 symbolizes its double function, i.e. both for translating and storing.

Figure 2:
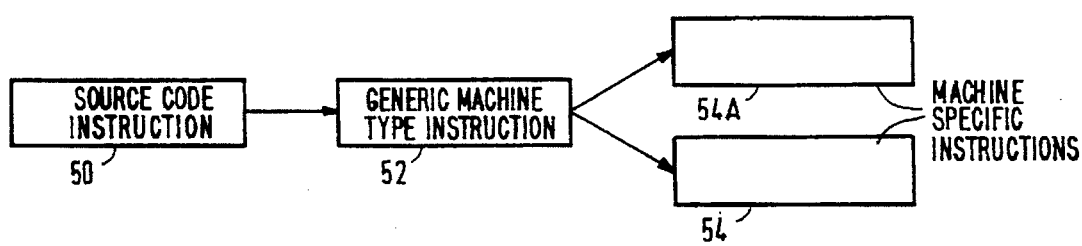
FIG. 2 symbolizes machine-type generic code versus machine-type specific code.

FIG. 2 symbolizes machine-type generic versus machine-type specific code. Block 50 represents a source code instruction. The source code instruction is generally directly readable to humans through the use of mnemonics, separate register identifiers, and the like. On a syntactic level, the program which includes these source codes may be executable even if it contains a certain amount of error, such as a superfluous or missing bracket. Block 52 represents a machine-type generic instruction. This need not be human-readable anymore, but on the other hand, the formulation in the program must be completely correct. Block 54 and 54a represent two different machine-specific instructions that execute only on a particular machine type. The arrows shown in the Figure indicate the interrelations between various types of instructions.

Figure 3:
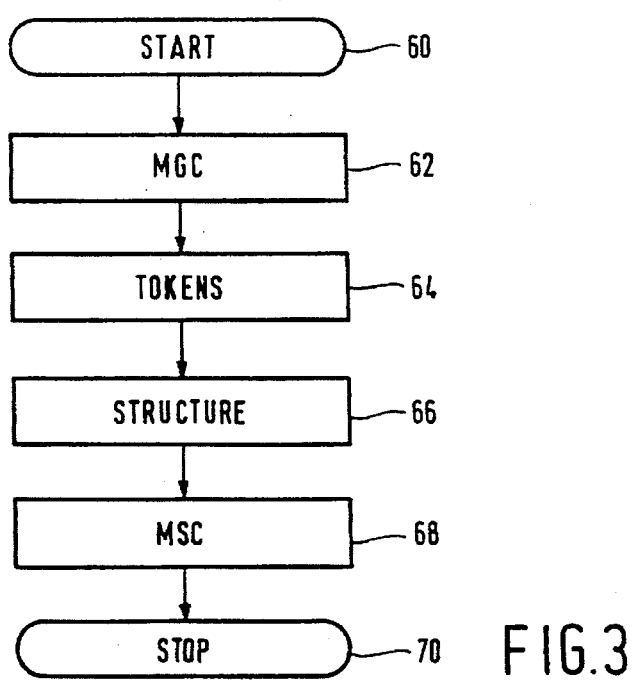
FIG. 3 is a flow chart illustrating the conversion process.

FIG. 3 is a flow chart illustrating the conversion process. Generally, translation from machine type generic code into machine type specific code follows the same path as a traditional compilation process from a high level programming language into machine specific code. The present process can be highly optimized however when the machine generic code notation has been designed carefully, as will be shown hereinafter.

The compilation process knows four successive stages. In FIG. 3, block 60 indicates the initiation, that provides sufficient amount of facilities, such as storage and processing capacity. In block 62, the machine generic code is loaded. Machine generic code includes 8-bit characters and is mapped by a scanner onto a sequence of tokens or symbols that each are also of 8-bit size; the production of the token stream has been symbolized by the transition to block 64. Due to the particular structure of machine generic code, this is almost a one-to-one mapping on a character basis. For example, each separator item, every bracket, and any mnemonic is mapped on a single such character.

A small category of symbols need more than one character, such as an integer that has an appreciable range. In contradistinction, for compiling a high-level language, it takes a considerable amount of effort to translate the character stream into a token stream.

Upon transition to block 66, the token stream is converted in a stream-based manner into a data structure which conversion is executed by a parser or syntax analyzer. The structure of the machine generic code specifically represents, for example, various declarations, operations, labels, etcetera each by only a single character. By choosing a simple structure for MCG programs, the conversion process can be kept simple and hence, efficient. Upon transition to block 68, the translation of the structure to machine specific code is executed by a code generator. Because the machine specific code has a low level character (in contrast to high level language), the latter conversion step is relatively simple and hence, efficient. In block 70, the process is terminated through unloading the new code generated.

In general, the machine code generic translator can be much more efficient than a high level language translator, because the machine generic code has been specifically designed to attain such efficiency.

FIG. 4 is an example of a particular program listing in higher level language C. The program was conventionally conceived by a human programmer. For simplicity, an extremely simple example has been provided that allows calculation of function by operating on two arrays x, y, of which the dimensions may be specified later in a particular interval. In particular, the usage of four different "for" statements is apparent. Inclusive of a certain amount of looping, and declaration of intermediate variables s, t, i, the program as shown counts 277 characters that each are represented as a particular 8-bit character. Although a human person can readily grasp the meaning and overall structure of the program, a machine cannot undertake execution, because it would not know what the meaning of the various characters would be. Further, mapping on the available hardware has not been specified, and is not rapidly apparent. Therefore, the formulation is hardware-independent.

FIGS. 5A and 5B show the same program after extensive optimization, listed in assembly language for a particular machine. In this example, the assembly language before a SPARC-based machine, SPARC being a trademark of SUN Corporation. Such program can be produced by a machine interpreter that processes the various listing elements of the program shown in FIG. 4 in their appropriate program context, checks for syntax errors, maps on hardware provisions it knows to be available, and in general, operates as an extremely useful tool to the human programmer. The listing is somewhat more compact than the listing shown in FIG. 4, because all opcodes, registers, data paths, memory addresses, etcetera can be specified explicitly by usually only a single character. In fact, since the assembly language list is closely related to the hardware, the listing contains much more information than the listing of FIG. 4. However, due to the mapping, the resultant length of the program is somewhat less than according to FIG. 1, namely only 224 characters. It should be noted, as explained more in detail hereinafter, that additional information would be needed in case scope rules would apply, that define the more or less global character of a particular variable, module, subroutine, etcetera, thereby influencing the associated callability. Such scope rules would indicate the modules that would call each other, which indications could apply to the whole program. However, after conversion of the program, these tables would again become superfluous: they can then be left out without requiring extra space.

FIG. 6 shows the same program in machine-generic language according to the invention listed after optimization, and as produced by a machine compiler according to the invention, starting from the source code of FIG. 4. Just as in the transition from FIG. 4 to FIGS. 5A and 5B, the machine compiler will check the source program for correctness, but it will not map on the hardware. Instead it will only suppose that a minimum amount of hardware is present, so that upon the real execution, the availability of more or less hardware (registers, data path width, separate multiplier, etc.) could highly influence the eventual processing speed. In the listing, each word, operand, isolated letter, or bracket has been converted in the form of a single 8-bit character, so that only 136 characters would be sufficient, which is rather much less than in the assembly listing of FIGS. 5A and 5B. The following particular measures have been taken to reduce the format, as starting from the higher language listing of FIG. 4. First, all type information has been suppressed that would discriminate among real, integer, array, etc: this can be ascertained easily upon execution. Second, all names of variables have been suppressed. Third, all keywords and standard symbols are again mapped on a single character each as explained supra. The listing is extremely compact, and moreover, can be processed fast because no so-called scope rules need be applied: these indicate the degree of localization, such as whether a particular variable has only local applicability or through its declaration belongs to a particular higher level in the structure of the program. This latter feature is not present in this particularly simple program, but finds wide application in nested program structures. Furthermore in this context, also brackets have been suppressed.

The following is a list of elements of the machine-generic program, together with their meaning or function, starting from the top:

Ff defines "function" with name f, which is the name of the program;

L4 specifies usage of four local variables;

C2.. instructs the clearing of variables 2,3,1, respectively;

1: is a label;

=4.. assigns to variable 4 the value of parameter ($) 1 that is indexed (@) with local variable (#) 1;

Z4 2: if variable 4 equals zero jump to label 2;

2 #4 add value of variable 4 to variable 2;

I1: increment variable 1;

G1: goto label 1 (this is the end of the first iterative loop); next follows clearing of variable 1 and a similar loop labeled 3, that only uses parameter 2;

L.. if variable 2 less than variable 3 goto label 5;

7:, 9: two further loops that each have two assignments;

=#4 assign to local variable 4 the value of the parameter as specified in the loop labeled "1";

=$1.. assign to parameter 1 indexed with value 1 the value of variable 4;

E: end

I claim:

1. A multi-media system for interactive presentation of user information, comprising:

interface means for reversibly interfacing to mass storage means containing an interactive user program;

access means for selectively accessing said mass storage means;

processing means connected to said accessing means for processing said user program;

display means fed by said processing means for displaying processing results; and user actuation means for, through selective user-actuation, controlling said accessing means and said processing means on an elementary user functionality level, wherein said processing means includes:

converter-to-object-code means for blockwise converting machine-type generic multi-instruction blocks read from said storage means to machine-type specific object code blocks for subsequent local storing; and secondary accessing means for selective accessing of said machine-type specific object code.

2. A system as claimed in claim 1, wherein said machine type generic instructions specify substantially all instructional codes and data elements as single characters.

3. A system as claimed in claim 1, wherein said mass storage means is unitary shaped and said interface means comprises berth means therefor for removable positioning of the mass storage means.

4. A system as claimed in claim 3, wherein said mass storage means is an optically readable disc.

5. A system as claimed in claim 3, wherein said mass storage means is a magnetically readable tape.

6. A system as claimed in claim 3, wherein said mass storage means is solid state.

7. Unitary mass storage means for use in a multi-media system for interactively presenting user information, said unitary storage means being removably positioned and accessible with respect to said multi-media system, said unitary storage means comprising machine-type generic multi-instruction blocks that are blockwise accessible by said multi-media system for therein converting the machine-type generic multi-instruction blocks to machine-type specific object code, for subsequent selective accessing and executing by execution means contained in processing means under selective user-actuation of said multi-media system on an elementary user functionality level for subsequent display.

8. Unitary mass storage means as claimed in claim 7, wherein said machine-type generic instructions specify substantially all instructional codes and data elements as single characters.

9. A system as claimed in claim 2, wherein said mass storage means is unitary shaped and said interface means comprise berth means therefor for removable positioning of the mass storage means.

* * * * *